US012677938B2

(12) United States Patent
Chumakov

(10) Patent No.: US 12,677,938 B2
(45) Date of Patent: Jul. 14, 2026

(54) BAND BRAKE MECHANISM

(71) Applicant: Humanscale Corporation, New York, NY (US)

(72) Inventor: Vladimir Stanislavovich Chumakov, Brooklyn, NY (US)

(73) Assignee: Humanscale Corporation, New York, NY (US)

( * ) Notice: Subject to any disclaimer, the term of this patent is extended or adjusted under 35 U.S.C. 154(b) by 159 days.

(21) Appl. No.: 18/606,677

(22) Filed: Mar. 15, 2024

(65) Prior Publication Data

US 2024/0306807 A1 Sep. 19, 2024

Related U.S. Application Data

(60) Provisional application No. 63/452,753, filed on Mar. 17, 2023.

(51) Int. Cl.
| | |
|---|---|
| *A47B 9/12* | (2006.01) |
| *A47B 9/02* | (2006.01) |
| *F16D 63/00* | (2006.01) |
| *F16D 121/16* | (2012.01) |

(52) U.S. Cl.
CPC .............. *A47B 9/12* (2013.01); *F16D 63/008* (2013.01); *A47B 9/02* (2013.01); *A47B 2220/0002* (2013.01); *F16D 2121/16* (2013.01)

(58) Field of Classification Search
CPC ........... A47B 9/12; A47B 9/02; F16D 63/008; F16D 2121/16
See application file for complete search history.

(56) References Cited

U.S. PATENT DOCUMENTS

| | | | | |
|---|---|---|---|---|
| 3,905,311 | A * | 9/1975 | Carpentier | A47B 23/046 |
| | | | | 108/147 |
| 9,038,549 | B1 * | 5/2015 | Zebarjad | A47B 9/12 |
| | | | | 108/147 |
| 9,332,836 | B1 | 5/2016 | Zebarjad | |
| 9,457,990 | B2 | 10/2016 | Osmanbasic et al. | |
| 10,820,690 | B2 * | 11/2020 | Tao | A47B 9/12 |
| 10,952,531 | B2 * | 3/2021 | Franz | A47B 9/12 |
| 11,419,410 | B1 * | 8/2022 | Tang | A47B 9/12 |
| 2006/0130713 | A1 | 6/2006 | Jones et al. | |
| 2013/0248298 | A1 * | 9/2013 | Osmanbasic | B66B 5/20 |
| | | | | 187/359 |

(Continued)

OTHER PUBLICATIONS

PCT Application No. US24/20209; International Search Report and Written Opinion of the International Searching Authority for Applicant Humanscale Corporation dated Jul. 11, 2024.

*Primary Examiner* — Daniel J Rohrhoff
(74) *Attorney, Agent, or Firm* — Jones Walker LLP

(57) ABSTRACT

A band brake suitable for use with height adjustable tables and configured to selectively grip and release a lift band utilized by the table's height adjusting mechanism to raise and lower the work surface. The band brake may include an eccentric roller configured to move between a band-engaged position and a band-disengaged position. A release lever is connected to the eccentric roller and configured to transition the eccentric roller between the band-engaged and the band-disengaged positions. A linkage system is connected between the brake housing and the release lever, whereby the linkage system counteracts torque created by a release spring operating on the release lever.

20 Claims, 8 Drawing Sheets

(56)                    References Cited

U.S. PATENT DOCUMENTS

| | | | |
|---|---|---|---|
| 2018/0092457 A1* | 4/2018 | Lai ............................ | A47B 9/20 |
| 2019/0269236 A1 | 9/2019 | Lindblad et al. | |
| 2020/0329862 A1* | 10/2020 | Tao .......................... | A47B 9/12 |
| 2022/0177271 A1* | 6/2022 | Roberts ..................... | B66B 5/20 |
| 2022/0248839 A1 | 8/2022 | Tang et al. | |

* cited by examiner

BAND BRAKE MECHANISM

RELATED APPLICATION(S)

This application claims the priority benefit under USC § 119 to U.S. Provisional Application No. 63/452,753, filed on Mar. 17, 2023, which is incorporated by reference herein in its entirety.

BACKGROUND OF THE INVENTION

Height adjustable desks and tables are becoming increasingly popular in the office environment. One mechanism for allowing height adjustment involves bands passing through a pulley system in the legs of the table (see for example U.S. Pat. No. 9,038,549). In such systems, the height of the table is adjusted by releasing a brake mechanism gripping the bands, and then the brake mechanism being allowed to re-grip the bands when the table has been moved to the desired height. However, the prior art brake mechanisms often lack smooth and consistent operation when gripping and releasing the bands. It would be advantageous to offer more efficient brake mechanisms which allow users to experience more seamless functionality when releasing and re-applying the brake upon adjustment of table height.

SUMMARY OF THE INVENTION

One embodiment of the present disclosure is a height adjustable table having a band brake configured to selectively grip and release the band of the table's height adjusting mechanism. The band brake includes an eccentric roller configured to move between a band-engaged position and a band-disengaged position. A release lever is connected to the eccentric roller and configured to transition the eccentric roller between the band-engaged and the band-disengaged positions. Finally, a linkage system is connected between the brake housing and the release lever, whereby the linkage system counteracts torque created by a release spring operating on the release lever.

In another embodiment, the eccentric roller is configured to apply force to a first side of the band and at least one brake roller is configured to apply force to a second side of the band. The eccentric roller applies force to a friction plate which in turn engages the first side of the band. The brake roller is positioned between the band and an inclined clutch plate such that (i) movement of the brake roller in a first direction increases engagement of the brake roller with the band, and (ii) movement of the brake roller in an opposite direction decreases engagement of the brake roller with the band.

Still further embodiments will be apparent from the following Detailed Description.

BRIEF DESCRIPTION OF DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention.

DETAILED DESCRIPTION

Figures 1, 2:
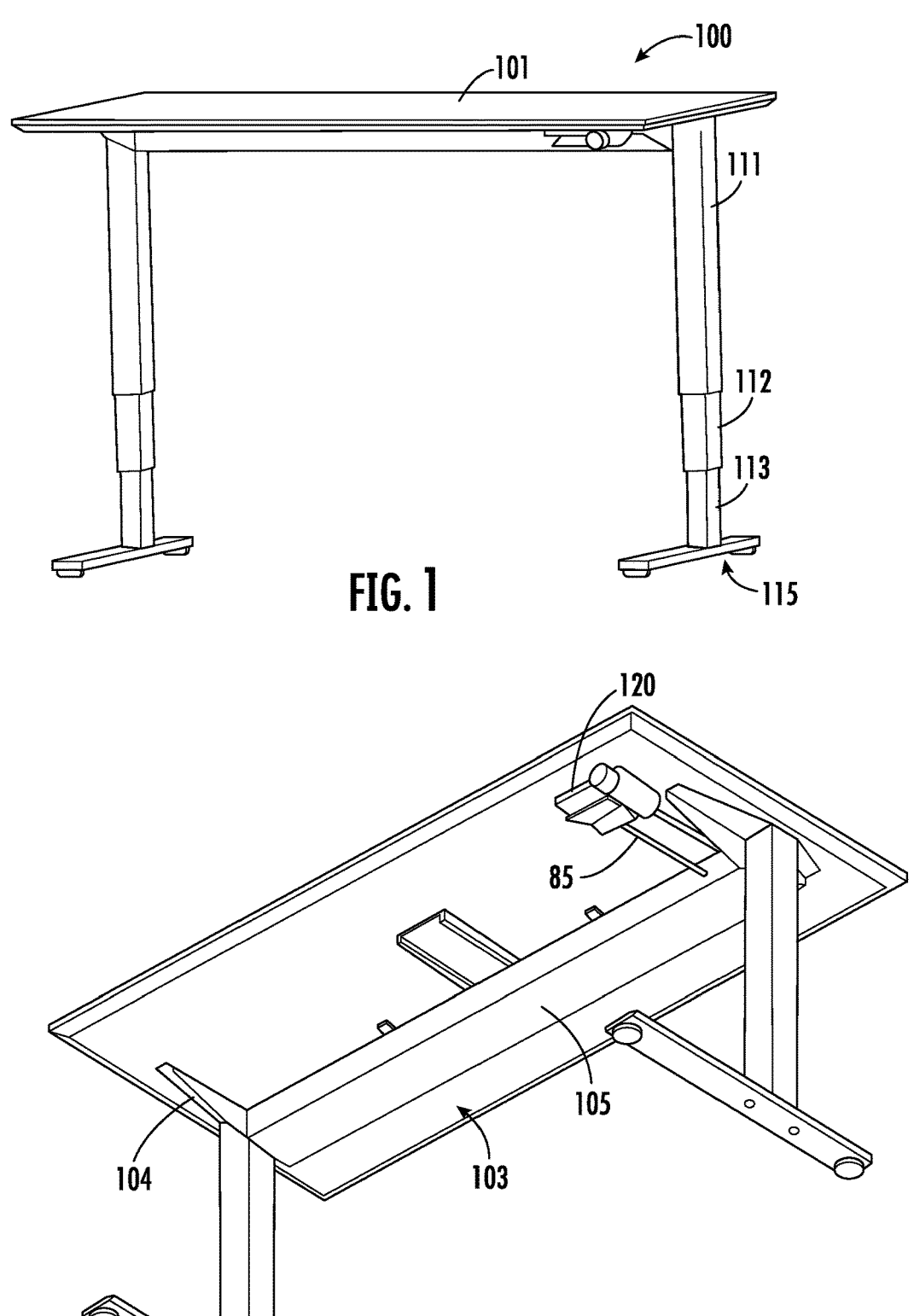
FIG. 1 illustrates one example of an adjustable height table applicable to the present disclosure.
FIG. 2 illustrates the underside of the table seen in FIG. 1.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include, other elements not expressly listed or inherent to such process, method, article, or apparatus. An element proceeded by "comprises" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. Where a numerical limitation is used, unless indicated otherwise by the context, "about" means the numerical value can vary by +/−5%, +/−10%, or in certain embodiments+/−15%, or possibly as much as +/−20%. Similarly, the term "substantially" will typically mean at least 85% to 99% of the characteristic modified by the term. For example, "substantially all" will mean at least 85%, at least 90%, or at least 95%, etc. Relational terms such as first and second, top and bottom, right and left, and the like may be used solely to distinguish one entity or action from another entity or action without necessarily requiring or implying any actual such relationship or order between such entities or actions. "Vertical" or "vertical direction" as used herein means a direction that is generally parallel to Earth's gravitational force. "Horizontal" or "horizontal direction" as used herein means a direction that is generally perpendicular to Earth's gravitational force. As used herein, "generally perpendicular" means forming an angle of 90 degrees or forming an angle between 85 degrees and 95 degrees.

Referring now to FIGS. 1-4, an exemplary embodiment of a height adjustable table is depicted, which is more fully disclosed in U.S. Pat. No. 9,038,549 and hereby incorporated by reference in its entirety. Referring to FIGS. 1-2, the height adjustable table 100 may comprise a table surface (or "work surface") 101 supported by a base assembly 103. The base assembly 103 includes mechanical housing 105 and a series plates 104 for stabilizing the table surface 101 on base assembly 103. The base assembly 103 can further comprise right and left adjustable or telescoping leg assemblies 110, with each leg assembly having an outside leg (or leg segment) 111, a middle leg segment 112, an inside leg segment 113, and a foot 115. The leg segments 111, 112, 113 have a variable overlap to accommodate height adjustment of the table surface 101. The outside leg segment 111 is attached to the base assembly 103 and thereby moves with the table surface 101 as it is raised and lowered. The inside leg segment 113 is attached to the foot 115 and remains stationary as the table surface 101 is raised and lowered. The height adjustable table 100 features a synchronized lift mechanism that allows for single-handed, level height adjustment of the work surface 101 regardless of whether the adjustment force is applied to the middle, right side, or left side of the table surface 101.

Figure 3:
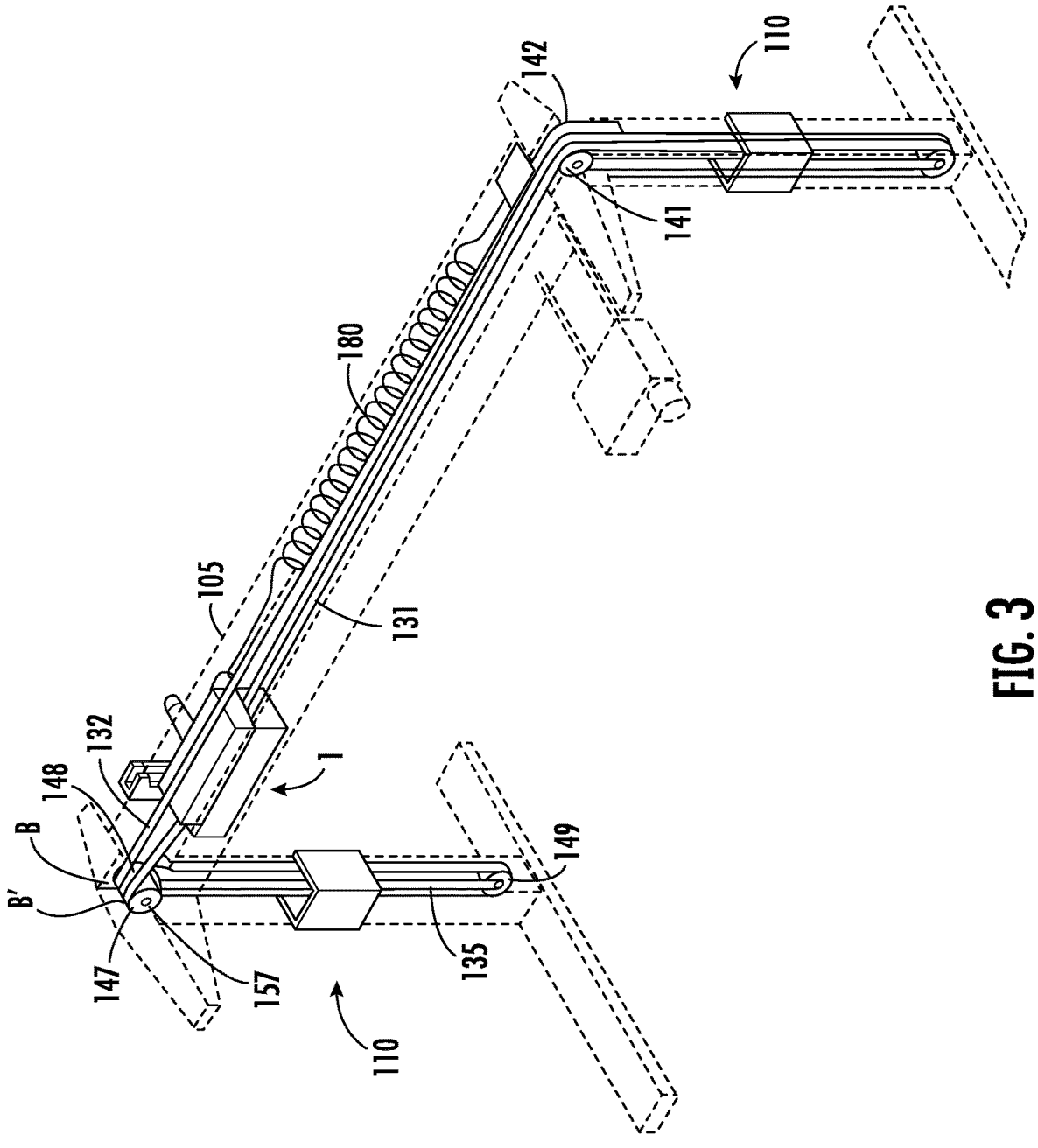
FIG. 3 illustrates one embodiment of the height adjusting mechanism of the FIG. 1 table.
Figure 4:
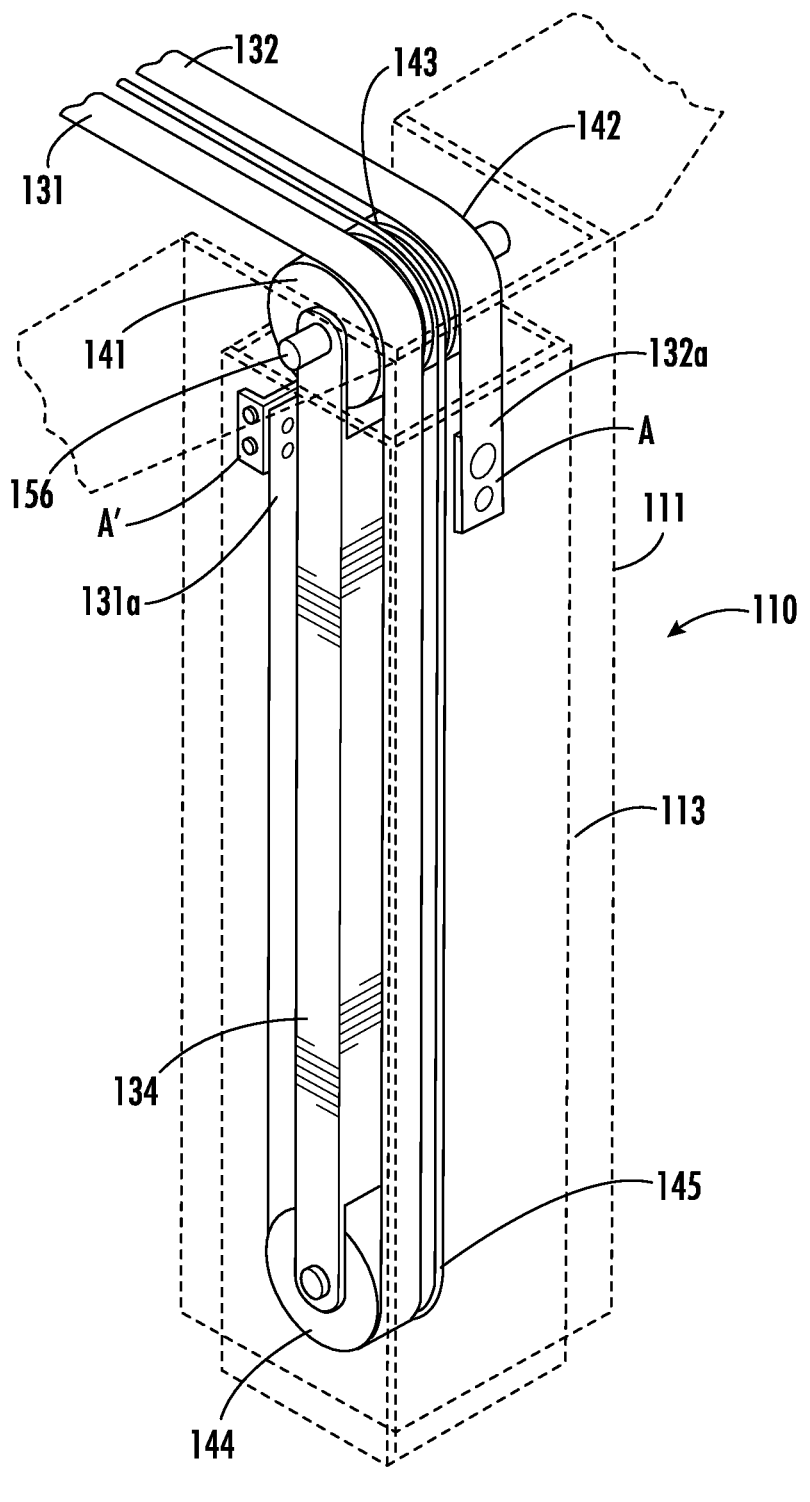
FIG. 4 illustrates one embodiment of the height adjusting mechanism in a table leg.

An embodiment of the synchronized lift mechanism is depicted in FIGS. 3-4. In this embodiment, the synchronized lift mechanism comprises first and second bands 131, 132, which interact with a pulley system positioned within the legs 110 and housing 105 to provide synchronized lifting or lowering of the table surface 101. The first and second bands 131, 132 preferably are constructed out of metallic or semi-metallic material having a relatively high tensile strength, such as steel. In one embodiment, the steel bands are approximately 0.2 mm thick and 14 mm wide. However, one skilled in the art will recognize that the bands can alternatively be constructed out of a wide variety of materials and take on a wide variety of shapes. As used herein, the terms "band" or "bands" are defined broadly to include bands, cords, cables, ropes or any other slender length of flexible material. An exemplary pulley system comprises right and left pulley assemblies positioned within the right and left telescoping leg assemblies. The right pulley assembly comprises a first upper pulley 141, a second upper pulley 142, and an upper lift cable pulley 143 each mounted to an axle 156 (best seen in FIG. 4) that is secured to the outside leg segment 111 of the right telescoping leg assembly 110. A lower pulley 144 and a lower lift cable pulley 145 are connected to the first upper pulley 141 by a right shaft 134 that is suspended within the internal cavity of the outside, middle, and inside leg segments 111, 112, 113 of the right telescoping leg assembly. Similarly, the left pulley assembly (FIG. 3) comprises a first upper pulley 147 and a second upper pulley 148 each mounted to an axle 157 that is secured to the outside leg segment 111 of the left telescoping leg assembly 110. A lower pulley 149 is connected to the second upper pulley 148 by a left shaft 135, which is suspended within the internal cavity of the outside, middle, and inside leg segments 111, 112, 113 of the left telescoping leg assembly 110.

The first and second bands 131, 132 are operatively engaged with the pulley system as described below. As seen in FIG. 4, the right end 132a of the second band 132 is connected to the inside leg 113 of the right leg assembly at attachment point A. From attachment point A, the second band 132 extends around the second upper pulley 142 of the right pulley assembly, across the housing 105 (FIG. 3), around the second upper pulley 148 of the left pulley assembly, down the left shaft 135, around the second lower pulley 149, and up the other side of the left shaft 135, where the second band 132 attaches to the left inside leg segment 113 at attachment point B (hidden from view). In a similar manner, the left end 131b of the first band 131 is connected to the inside leg segment 113 of the left leg assembly at attachment point B' (also hidden from view in FIG. 3). From attachment point B', the first band 131 extends around the first upper pulley 147 of the left pulley assembly, through a lock assembly or band brake 1 (described below) as it traverses the housing 105, around the first upper pulley 141 of the right pulley assembly, down the right shaft 134 (see FIG. 4), around the lower pulley 144 of the right pulley assembly, and then up the other side of the right shaft 134, where the first band 131 attaches to the right inside leg 113 at attachment point A'. Though this arrangement, the left and right sides of the lift mechanism are synchronized, which allows the table surface 101 to be raised and lowered evenly regardless of whether the adjustment force is applied to the middle, right side, or left side of the table surface 101.

As described in greater detail in U.S. Pat. No. 9,038,549, this example of height adjustable table 100 features a constant-force counterbalance mechanism disposed within the housing 105. In most applications, it is desirable for a height adjustable table's counterbalance mechanism to provide a constant counter-weighting force to offset the constant load on the work surface 101. The counterbalance mechanism utilizes a tension spring 180 (FIG. 3) to provide the counter-weighting force. However, it is well known that the force exerted, for example, by a typical tension spring varies linearly with its extension. To offset the linearly increasing force exerted by the tension spring 180, the counterbalance mechanism employs a snail cam pulley (see U.S. Pat. No. 9,038,549), which operates in conjunction with the tension spring 180 to provide a relatively constant counter-weighting force.

Figure 5A:
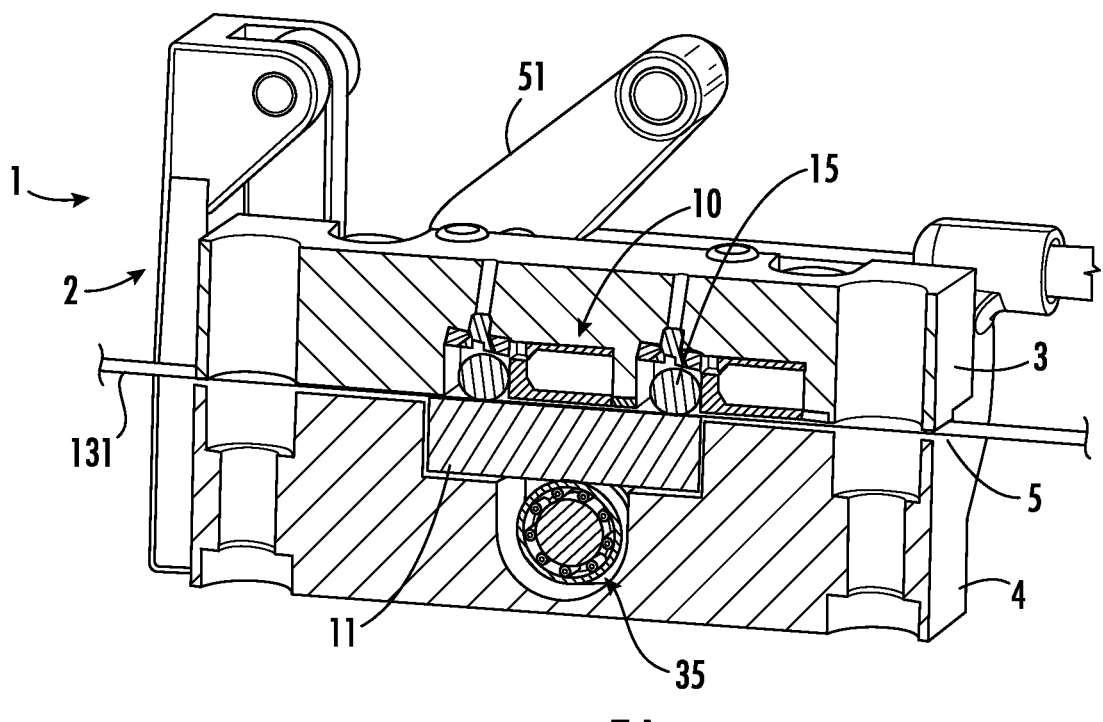
FIG. 5A is a cross-sectional view of a band brake mechanism in the band engaged position.

As suggested above, a band brake 1 will selectively grip one of the bands 131 or 132 (band 131 in the FIG. 3 embodiment). When band brake 1 grips or engages the band, the table surface 101 is locked in place and its height cannot be adjusted. When band brake 1 is released or disengaged (e.g., by actuating release handle 120 and release cable 85 seen in FIG. 2), the bands can slide across the pulleys and the telescoping legs may lengthen or shorten as described above in order to adjust the height of table surface 101. One embodiment of band brake 1 is shown in FIGS. 5A-9B. FIG. 5A suggests how band brake 1 is generally formed by a brake housing 2 comprising upper shoe 3 and lower shoe 4. A band channel 5 is formed between upper shoe 3 and lower shoe 4 with band channel 5 sized to accommodate the passage of band 131. Band brake 1 is configured to move between two positions: (i) a band engaged position, and (ii) a band disengaged position. In the illustrated embodiments, engagement of band 131 is accomplished by friction plate 11 engaging one surface of band 131 and the brake rollers 15 engaging the opposite surface of band 131.

Figure 5B:
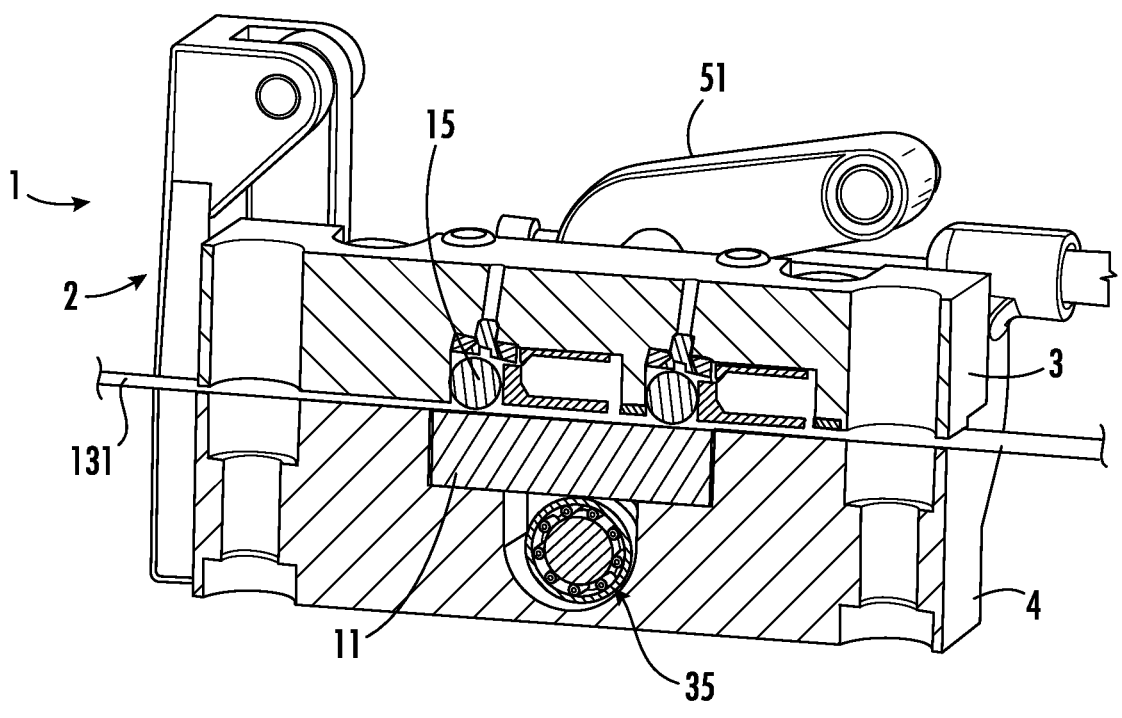
FIG. 5B is a cross-sectional view of the FIG. 5A band brake mechanism in the band disengaged position.
Figure 6A:
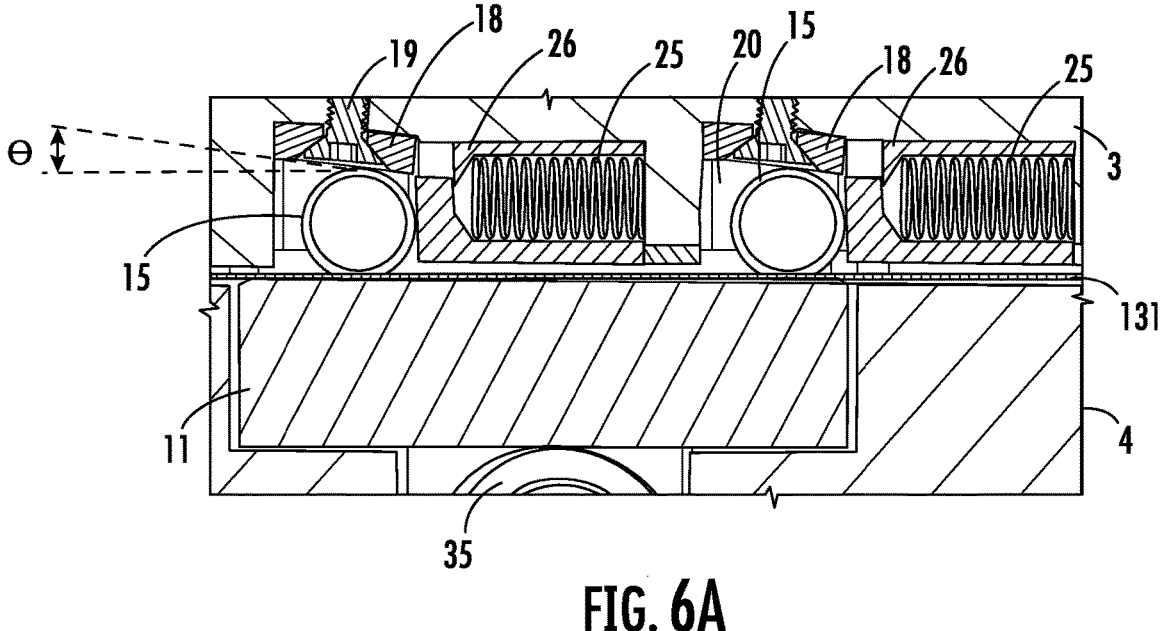
FIG. 6A is an enlarged cross-sectional view of brake rollers of the FIG. 5A band brake.
Figure 6B:
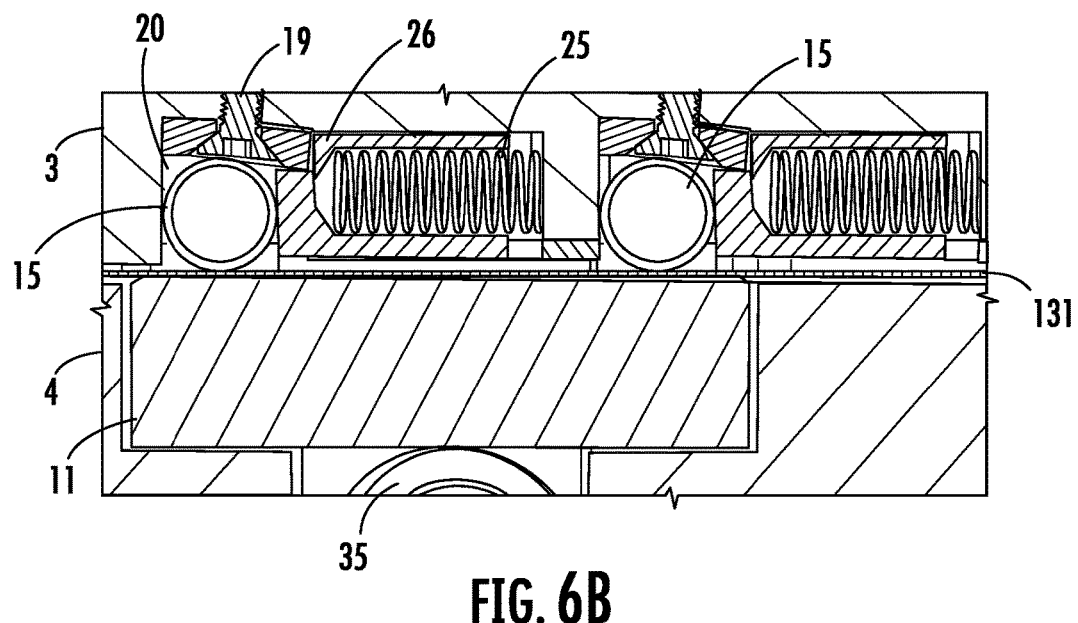
FIG. 6B is an enlarged cross-sectional view of brake rollers of the FIG. 5B band brake.
Figure 7A:
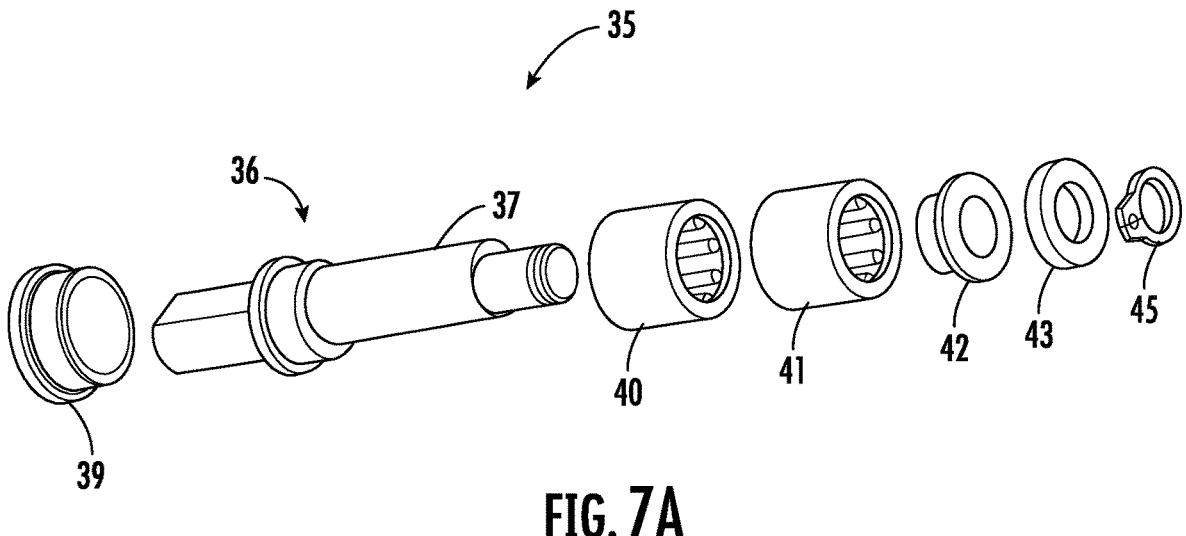
FIG. 7A is an exploded view of one eccentric roller assembly used in the band brake.
Figure 7B:
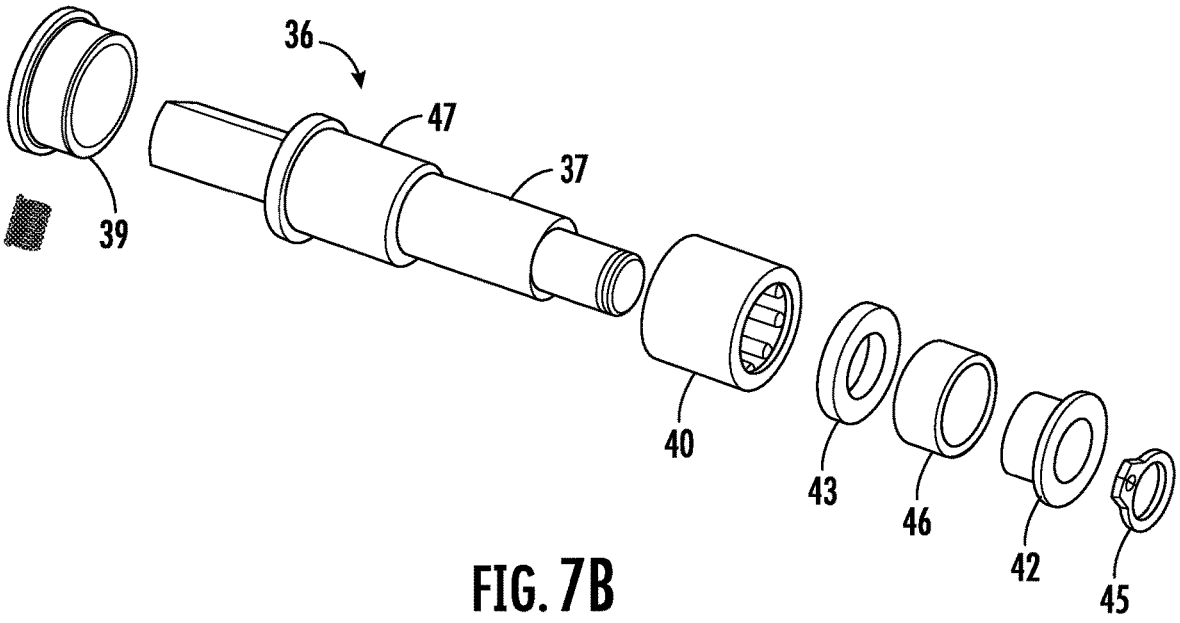
FIG. 7B is an exploded view of an alternative eccentric roller assembly.
Figure 8:
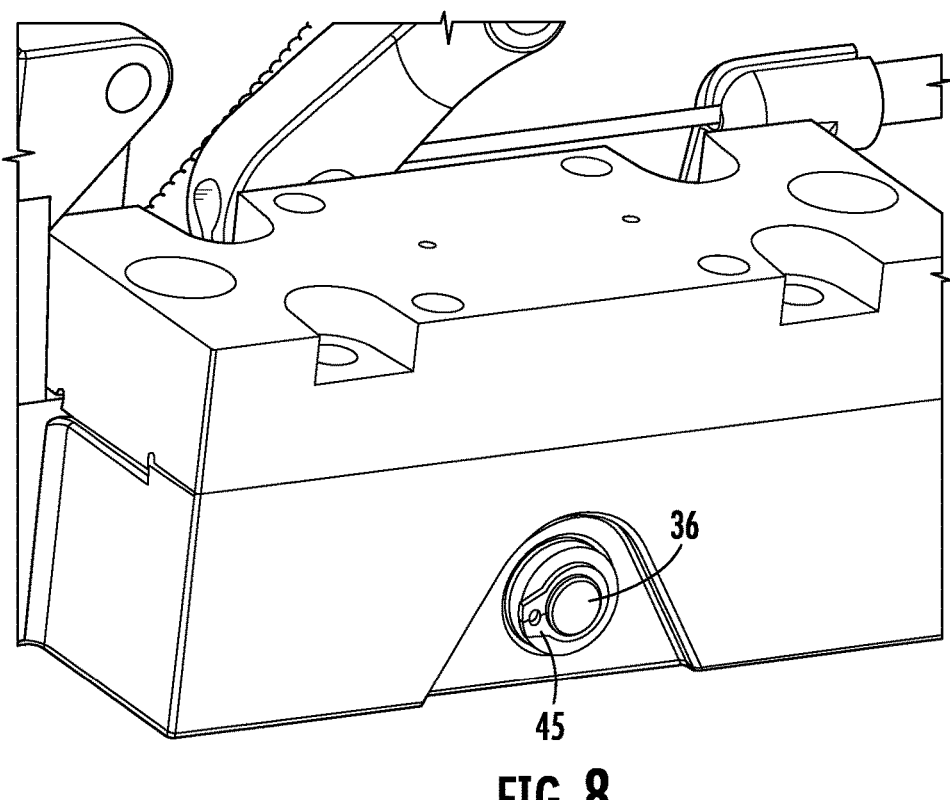
FIG. 8 is a side perspective view of the band brake.

FIGS. 5A and 5B also illustrate one mechanism for moving friction plate 11 into and out of engagement with band 131, i.e., the eccentric roller assembly 35. While FIGS. 5A and 5B suggest how eccentric roller assembly 35 is positioned beneath friction plate 11 within lower shoe 4, FIG. 7A provides more detail on the components of one embodiment of eccentric roller assembly 35. FIG. 7A shows how eccentric roller assembly 35 includes the cam roller shaft 36 having cam surface 37. It may be envisioned how sleeve bearing 39 supports one end of cam roller shaft 36 within lower shoe 4 while the retaining ring 45 maintains bearings 40 and 41, flange bushing 42 and washer 43 on cam roller shaft 36 (see FIG. 8). FIG. 7B shows a slightly modified embodiment of eccentric roller assembly 35. In this embodiment, the cam roller shaft 36 has a somewhat longer collar section 47 and only a single bearing 40. This version of eccentric roller assembly 35 also employs the bushing spacer 46, but otherwise operates in substantially the same manner as the FIG. 7A embodiment. FIGS. 6A and 6B show in more detail how brake rollers 15 are brought into engagement with the upper surface of band 131. Positioned in the upper portion of the cavity 20 within upper shoe 3, above brake rollers 15, are the clutch plates 18 held in place by the retaining screws 19 being threaded into the body of the upper shoe 3. Clutch plates 18 are flat plates oriented or inclined at an angle of θ with respect to the plane containing the upper surface of friction plate 11 which engages band 131. In the illustrated embodiments, θ could typically range between 3° and 10°, and more preferably is about 7°. FIG. 6A suggests the friction plate 11 in the raised position (i.e., when band brake 1 is activated) such that band 131 is pressed into engagement with brake rollers 15 by friction plate 11 in order to induce friction on band 131 and limit movement of band 131 through brake housing 2. It may be envisioned how movement of band 131 from left to right in FIG. 6A will tend to pull brake rollers 15 to the right and wedge brake rollers 15 more tightly against the inclined surface clutch plates 18. Because of the inclined orientation of clutch plates 18, movement of the brake rollers 15 further against clutch plates 18 will increase the downward force brake rollers 15 impart to band 131 (i.e., increase the rollers engagement with band 131) and render band 131 even more resistant to movement in a rightward direction through brake housing 2. In certain embodiments, the brake rollers 15 can be high carbon, tool or stainless steel. In typical embodiments, the material of the rollers will be harder than the material of the band. For example, if the band is plastic, the brake rollers would be a harder type of plastic or perhaps aluminum. A wide range of materials could be employed. It normally is preferred that the material of friction plate 11 be same hardness as the band, but this condition is not strictly necessary. Clutch plates 18 could be high carbon steel or polished tool steel—preferably the same material as the brake rollers. In the illustrated embodiments, movement of band 131 to the right corresponds to the lowering of table surface 101. In other words, the weight of table surface 101 tends to pull band 131 to the right in FIGS. 6A and 6B. Thus, the inclination of clutch plates 18 is oriented such that the weight of table surface 101 biases the brake rollers to impart more force to band 131.

FIG. 6B illustrates friction plate 11 and brake rollers 15 not engaged with band 131 such as when the band brake 1 is in the released or disengaged position. As shown in FIG. 6B, brake rollers 15 are positioned in the left-most position under the highest portion of clutch plate 18 and friction plate 11 has been lowered by rotation of eccentric roller assembly 35 such that cam surface 37 (FIG. 7) is not urging friction plate 11 upward into contact with band 131. In this position, band 131 will be free to move left or right through brake housing 2 with minimal frictional resistance. FIG. 6B also depicts how the spring carriers or spring housings 26 will act to bias the brake rollers 15 toward the released or disengaged position. When friction plate 11 is not forcing the band 131 toward brake rollers 15, the brake rollers are not constrained against the clutch plates 18 and the springs 25 will move the rollers to the left in FIG. 6B. This places the brake rollers 15 at the highest point along clutch plates 18 and minimizes any force placed on band 131 by the brake rollers. Thus, when the friction plate 11 is lifted causing brake rollers 15 to firmly engage band 131 (i.e., FIG. 6A), rightward movement of band 131 pulls brake rollers 15 to the right, where brake rollers 15 both compress springs 25 and place increasing force on band 131 as the brake rollers 15 move down the inclined surfaces of clutch plates 18. Contrarily, when friction plate 11 is lowered to release force on band 131, the force on brake rollers 15 is reduced sufficiently that springs 25 and spring housings 26 can move brake rollers 15 back to the left into the band release or disengaged position, i.e., springs 25 bias the brake rollers 15 in the direction of decreasing engagement of the brake rollers 15 with band 131. As used herein, "band-disengaged" does not necessarily mean the friction plate 11 or brake rollers 15 are not touching band 131. Rather "band-disengaged" simply means that friction plate 11 and/or brake rollers 15 are not exerting sufficient force on band 131 to prevent the band from moving through brake housing 2. Although the illustrated embodiments describe the cam roller 36 engaging the brake band via friction plate 11, other embodiments could have the cam roller 36 directly engaging the band, i.e., eliminating the friction plate 11. Similarly, while the Figures show band brake 1 having two brake rollers 15, other embodiments could have a single brake roller or more than two brake rollers.

Figure 6C:
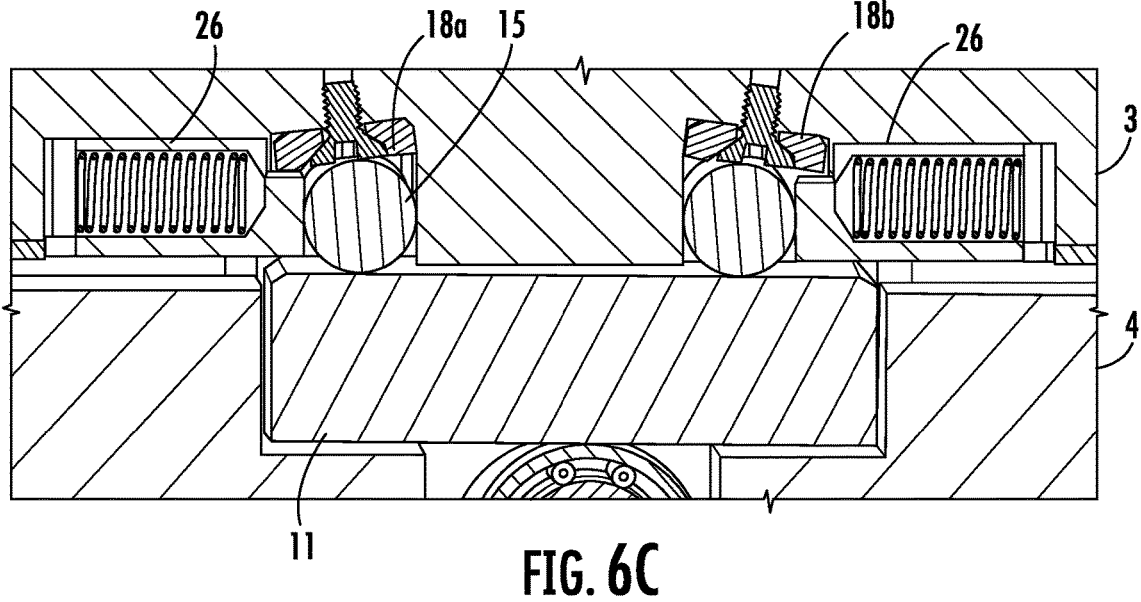
FIG. 6C is a cross-sectional view of an alternative clutch plate orientation.

FIG. 6C suggests a different arrangement of the two clutch plates 18. In this embodiment, the clutch plates 18a and 18b are inclined in opposing directions. This results in one brake roller 15 pressing down on the band regardless of which way the band moves. For example, if the band moves to the left in FIG. 6C, the left brake roller 15 will be forced against clutch plate 18a and more forcefully engages the band. Conversely, if the band moves to the right, the right brake roller 15 will be forced against clutch plate 18b and again more fully engage the band. As in the previous embodiment, the spring housings 26 are arranged to push the brake rollers out of engagement (or less forceful engagement) with the clutch plates once friction plate 11 is lowered out of binding contact with the band.

Figure 9A:
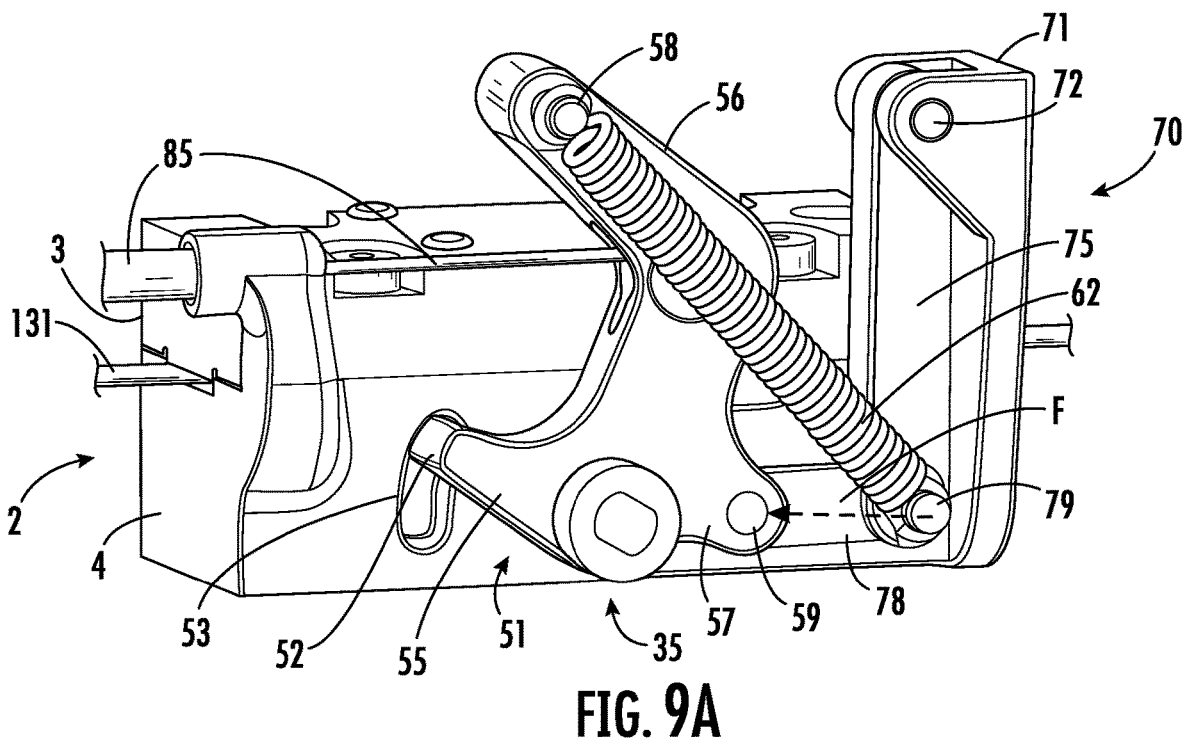
FIG. 9A is a perspective view of the release lever of the band brake in the band engaged position.
Figure 9B:
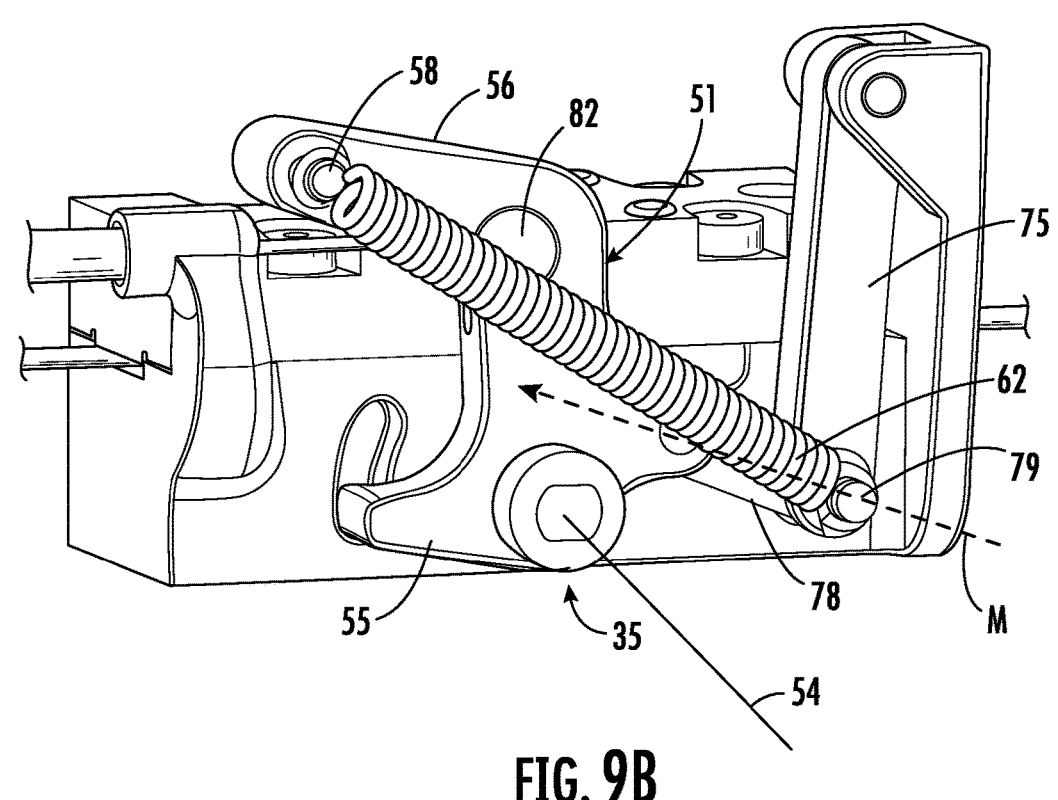
FIG. 9B is a perspective view of the release lever of the band brake in the band disengaged position.

FIGS. 9A and 9B illustrate one mechanism which may be used to rotate the eccentric roller assembly 35 and cause friction plate 11 and brake rollers 15 to engage/disengage band 131. FIG. 9B shows a release lever 51 connected to eccentric roller assembly 35 in a manner such that rotation of release lever 51 forward (e.g., around a pivot axis 54 extending through the eccentric roller assembly 35) causes the cam surface of eccentric roller assembly 35 to move away from friction plate 11 and allows friction plate 11 to disengage from band 131. In the opposite manner, release lever 51 being in the position shown in FIG. 9A causes the cam surface of eccentric roller assembly 35 to lift friction plate 11 into engagement with band 131. The FIG. 9A embodiment of release lever 51 shows several extensions or arm sections on the release lever 51. For example, guide arm 55 carries the guide pin 52 which engages the guide slot 53 in the lower shoe 4, and thereby limits the rotation of release lever 51 between band-engaged or band-disengaged positions. Release lever 51 also has a link arm 57 to engage linkage system 70 (explained below) and bias arm 56 carrying the spring pin 58. A release cable 85 is connected to release lever 51 at the base of bias arm 56 by the cable stay 82 (best seen in FIG. 9B). In the illustrated embodiment, the release lever 51 forms the bias arm 56 and the guide arm 55 on a first side of the pivot axis 54 and the link arm 57 on the opposite or second side of the pivot axis 54. Furthermore, the release cable 85 applies force to the release lever 51 at a point between the bias arm 56 and the pivot axis 54.

The linkage system 70 generally comprises the housing clevis (or linkage mount) 71 formed as part of upper shoe 3, the first link 75 pinned to housing clevis 71 by clevis pin 72, the second link 78 pinned on one end to first link 75 by link pin 79 and on the other end to lever link arm 57 by lever pin 59. In the illustrated embodiment, the link pin is free to translate with respect to the housing, but the link pin does not directly engage the housing. As suggested above, release spring 62 will operate to bias release lever 51 in the engaged position (i.e., see FIG. 9A). One end of release spring 62 is fixed on spring pin 58 of bias arm 56 and the opposing end of release spring 62 is fixed on link pin 79. When release cable 85 is pulled away from release lever 51 (i.e., by a user activating release handle 120 in FIG. 2), release lever 51 rotates forward and rotates eccentric roller assembly 35 such that cam surface 37 (FIG. 7) allows friction plate 11 to move out of engagement with band 131 (i.e., FIG. 6B). In other words, the release lever is connected to the eccentric roller 35 and configured to transition the eccentric roller 35 from the band-engaged to the band-disengaged position. Thus, applying tension on release cable 85 causes release lever 51 to rotate forward to the band disengaged position as seen in FIG. 9B. Relaxing tension on release cable 85 allows release spring 62 to pull release lever 51 back into the band engaged position as seen in FIG. 9A. In one embodiment, release spring 62 is a conventional steel coil spring applying between about 40 to 50 N of force when extended as suggested in the Figures. Generally, it is desirable for release spring 62 to apply less than 100 N when extended. Also, any number of conventional or future developed biasing devices could be utilized in place of release spring 62 (e.g., heaving elastic band members).

It is desirable to have the user experience a uniform degree of force in activating release handle 120. Therefore, one object of the release lever seen in the Figures is to allow the release lever to be moved from its FIG. 9A position to the FIG. 9B position while the tension on release cable 85 remains reasonably consistent through release lever 51's entire range of motion. This should occur despite release spring 62 exerting increasing force between spring pin 58 and link pin 79 as release spring 62 lengthens. This consistency of tension in release cable 85 is generated by linkage system 70. As seen in FIG. 9A, force F on second link 78 caused by tension in release spring 62 initially acts on release lever 51 (i.e., at lever pin 59) in a direction approximately through the pivot axis 54 and therefore does not create any appreciable moment urging release lever 51 to rotate forward. However, as release lever 51 begins to rotate forward, force F is acting on lever pin 59 in a direction offset from pivot axis 54 and therefore begin creating a moment which urges release lever 51 forward. Thus, while tension in release spring 62 is increasing and potentially increasing tension in release cable 85, the moment created by release lever 51 is counter-acting that potential tension increase in release cable 85. In other words, the second link 78 applies an increasing moment around the pivot axis 54 as tension in the release spring 62 increases. In this manner, even though the tension in release spring 62 is significantly increasing (e.g., a 100% increase in tension), the user does not experience such a significant increase in force needed to operate release handle 120. This also provides the desirable result of the torque transmitted to the eccentric shaft 35 remaining substantially constant. In one preferred embodiment, the linkage system 70 is configured such that a torque required to rotate the release lever 31 (and consequently the tension on release cable 85) from the band-engaged to the band-disengaged position varies less than 25%.

Although not explicitly shown in the Figures, alternative designs of release lever 51 could be implemented with different linkage systems 70, or possibly eliminating linkage system 70. For example, the second link 78 could be removed and link pin 79's path could be constrained by a guide slot formed in the face of lower shoe 4. This should facilitate the same substantially uniform force activation of the band brake as described above.

Although certain detailed embodiments are disclosed above, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

What is claimed is:

1. A height adjustable table comprising:

(a) a work surface;

(b) adjustable legs supporting the work surface;

(c) a lift mechanism, including at least one band, wherein the lift mechanism is configured to allow height adjustment of the adjustable legs; and (d) a band brake configured to selectively grip and release the band, the band brake comprising:

i) a brake housing with the band extending therethrough;

ii) an eccentric roller extending into the housing, the eccentric roller configured to move between a band-engaged positioned and a band-disengaged position;

iii) a release lever connected to the eccentric roller and configured to transition the eccentric roller between the band-engaged and the band-disengaged positions;

iv) a linkage system with a first link connected to the brake housing and a second link connected to the release lever; and v) a biasing device connected between the release lever and the linkage system.

2. The height adjustable surface of claim 1, wherein the first link and the second link are joined by a link pin and the biasing device is connected to the link pin.

3. The height adjustable surface of claim 2, wherein the link pin is free to translate with respect to the housing.

4. The height adjustable surface of claim 2, wherein a pivot axis extends through the eccentric roller and the release lever rotates around the pivot axis.

5. The height adjustable surface of claim 4, wherein the release lever includes a bias arm and a guide arm on a first side of the pivot axis and a link arm on a second side of the pivot axis.

6. The height adjustable surface of claim 1, wherein the brake housing includes a guide slot and the release lever includes a guide pin engaging the guide slot, wherein the guide slot limits the release lever travel to movement between the band-engaged and the band-disengaged positions.

7. The height adjustable surface of claim 1, wherein a brake roller is positioned between the band and an inclined clutch plate such that (i) movement of the brake roller in a first direction increases engagement of the brake roller with the band, and (ii) movement of the brake roller in an opposite direction decreases engagement of the brake roller with the band.

8. The height adjustable surface of claim 7, wherein a biasing device biases the brake roller in the opposite direction of decreasing engagement of the brake roller with the band, wherein the biasing device includes a spring and spring housing, wherein the spring housing engages the brake roller.

9. The height adjustable surface of claim 7, wherein the housing comprises an upper and lower shoe, with (i) the band entering the housing between the upper and lower shoes; (ii) the eccentric roller positioned in the lower shoe, and (iii) the brake roller and the inclined clutch plate positioned in the upper shoe.

10. The height adjustable surface of claim 9, wherein at least two brake rollers are positioned in the upper shoe.

11. The height adjustable surface of claim 7, wherein the inclined clutch plate has an angle of inclination of between 3° and 10° relative to a plane containing the band.

12. The height adjustable surface of claim 7, wherein downward force on the adjustable legs pulls the band in the first direction increasing engagement of the brake roller with the band.

13. The height adjustable surface of claim 1, wherein brake rollers are positioned between the band and inclined clutch plates such that (i) movement of the first brake roller in the first direction increases engagement of the first brake roller with the band, and (ii) movement of the second brake roller in an opposite direction increases engagement of the second brake roller with the band.

14. A band brake configured to selectively grip and release a band, the band brake comprising:

(a) a brake housing with a band channel extending therethrough;

(b) an eccentric roller extending into the housing, the eccentric roller configured to move between a band-engaged positioned and a band-disengaged position;

(c) a release lever connected to the eccentric roller and configured to transition the eccentric roller between the band-engaged and the band-disengaged positions;

(d) a linkage system with a first link connected to the brake housing and a second link connected to the release lever; and (e) a biasing device connected between the release lever and the linkage system.

15. The band brake of claim 14, wherein the first link and the second link are joined by a link pin and the biasing device is connected to the link pin.

16. The band brake of claim 15, wherein a pivot axis extends through the eccentric roller and the release lever rotates around the pivot axis, and wherein the release lever includes a bias arm and a guide arm on a first side of the pivot axis and a link arm on a second side of the pivot axis.

17. The band brake of claim 14, wherein the brake housing includes a guide slot and the release lever includes a guide pin engaging the guide slot, wherein the guide slot limits the release lever travel to movement between the band-engaged and the band-disengaged positions.

18. A band brake configured to selectively grip and release a band, the band brake comprising:

(a) a brake housing with a band channel extending therethrough;

(b) an eccentric roller extending into the housing, the eccentric roller configured to move between a band-engaged positioned and a band-disengaged position, wherein the eccentric roller is configured to apply force to a first side of the band in the band-engaged position;

(c) and at least one brake roller configured to apply force to a second side of the band, the brake roller engaging an inclined clutch plate such that movement of the brake roller in a first direction increases engagement of the brake roller with the band, and movement of the brake roller in an opposite direction decreases engagement of the brake roller with the band; and (d) a release lever connected to the eccentric roller and configured to transition the eccentric roller between the band-engaged and the band-disengaged positions.

19. The band brake of claim 18, wherein the housing comprises an upper and lower shoe, with (i) the band channel extending through the housing between the upper and lower shoes; (ii) the eccentric roller positioned in the lower shoe, and (iii) the brake roller and the inclined clutch plate positioned in the upper shoe.

20. The band brake of claim 18, wherein the inclined clutch plate has an angle of inclination of between 3° and 10° relative to a plane containing the band channel.

* * * * *